Jan. 30, 1973 J. E. BUSCH ET AL 3,714,379

SWITCHING ARRANGEMENT FOR CONTROLLING PERIPHERAL UNITS
IN A TIME DIVISION MULTIPLEX COMMON CONTROL SYSTEM

Filed Jan. 26, 1972 5 Sheets-Sheet 1

SWITCHING ARRANGEMENT FOR CONTROLLING PERIPHERAL UNITS IN A TIME DIVISION MULTIPLEX COMMON CONTROL SYSTEM

Filed Jan. 26, 1972 5 Sheets-Sheet 2

United States Patent Office 3,714,379

Patented Jan. 30, 1973

3,714,379

SWITCHING ARRANGEMENT FOR CONTROLLING PERIPHERAL UNITS IN A TIME DIVISION MULTIPLEX COMMON CONTROL SYSTEM

John E. Busch, Clarendon Hills, and Sergio E. Puccini, Wood Dale, Ill., assignors to GTE Automatic Electric Laboratories Incorporated, Northlake, Ill.

Filed Jan. 26, 1972, Ser. No. 220,990
Int. Cl. H04q *11/04*
U.S. Cl. 179—18 J 14 Claims

ABSTRACT OF THE DISCLOSURE

A switching arrangement is employed in a register-sender subsystem of a telephone switching system of the type having a plurality of registers sharing common memory and logic circuits on a time division multiplex basis, each register being individually associated via a multiplexing unit with a plurality of register junctors serving as peripheral units for connection to a calling line during an originating portion of a call to receive call signals so that a connection can be established to a called line during a terminating portion of a call. Each one of the register junctors includes a plurality of pairs of originating and terminating indicating devices responsive to call processing signals from the registers, originating ones of the pairs of indicating devices being connected individually to a set of single conductors connected via the multiplexing unit to the registers. A single transfer switching device responds to a control signal from the registers for disconnecting the originating ones of the pairs of indicating devices from the conductors and for connecting individually the terminating ones of the pairs of indicating devices to the respective conductors, thereby permitting the conductors to serve a dual purpose.

BACKGROUND OF THE INVENTION

Field of the invention

The present invention relates to a time division multiplex common control system having a plurality of peripheral units connected via a multiplexing unit to a plurality of registers which are individually associated with the peripheral units and which share common memory and logic circuits, and it more particularly relates to a switching arrangement for controlling the peripheral units in such a system in an efficient manner.

Description of the prior art

Telephone switching systems with a time division multiplex common control arrangement in which a plurality of registers sharing common memory and logic circuits are well known for controlling the establishment of connections between calling and called lines. A plurality of peripheral units serving as register junctors are individually associated with the registers to receive call signals from calling lines and in turn to transfer the signals via a multiplexing unit to the registers.

Such a system is disclosed in U.S. Pat. 3,301,963 issued Jan. 31, 1967, to David Kwok Kang Lee and Howard L. Wirsing for Register-Sender Arrangement for a Communication Switching System Common Control Arrangement. Such systems include register junctors which perform a large number of call-processing control functions, such as dial tone control, busy tone control, calling station identification on party lines, and coin deposit test on paystation calls. A separate indicating device, such as a reed relay, is required for each one of the control functions, and thus a large number of control conductors and associated circuitry are provided for connecting the relays via the multiplexing unit to the registers. Therefore, it would be highly desirable to reduce substantially the number of connections and associated circuitry, while containuing to provide an efficient and reliable operation.

SUMMARY OF THE INVENTION

The object of this invention is to provide an efficient and reliable switching arrangement for controlling peripheral devices such as register junctors in a time division multiplex common control system.

According to the invention each one of the register junctors includes at least one pair of originating and terminating indicating devices which respond to call processing signals from the registers of the time division multiplex common equipment during the originating and terminating portions of a connection between a calling line and a called line, the originating indicating device of the pair of devices being connected to a single conductor connected via a multiplexing unit to the registers to receive an originating call processing signal during the originating portion of the call. A transfer device, which is a relay in the disclosed embodiment of the present invention, responds to a control signal from the registers for disconnecting the originating one of the pair of indicating devices from the conductor and for connecting the terminating one of the pair of devices to the conductor to receive a terminating call processing signal from the registers via the conductor so that the conductor serves a dual purpose. In the disclosed embodiment of the present invention, the transfer device connects the first one of the indicating devices to the conductor during the originating portion of the call, and it connects the other device to the conductor during the terminating portion of the call.

CROSS-REFERENCES TO RELATED APPLICATIONS

The invention claimed herein is disclosed in copending U.S. patent application Ser. No. 201,851, filed Nov. 24, 1971, by S. E. Puccini for a "Data Processor with Cyclic Sequential Access to Multiplexed Logic and Memory," hereinafter referred to as the Register-Sender patent application. However, applicants of the present application are the inventors of the matter claimed herein, the applicant of the Register-Sender patent application being one of the applicants herein.

DESCRIPTION OF THE PREFERRED EMBODIMENT

The subsystem in which the present invention is incorporated is described in said Register-Sender patent application. FIGS. 2, 3, 4 and 5 herein correspond to figures in that application, which may be referred to for further description. The time division multiplex arrangement of the register-sender control apparatus is described in detail therein.

Figure 1:
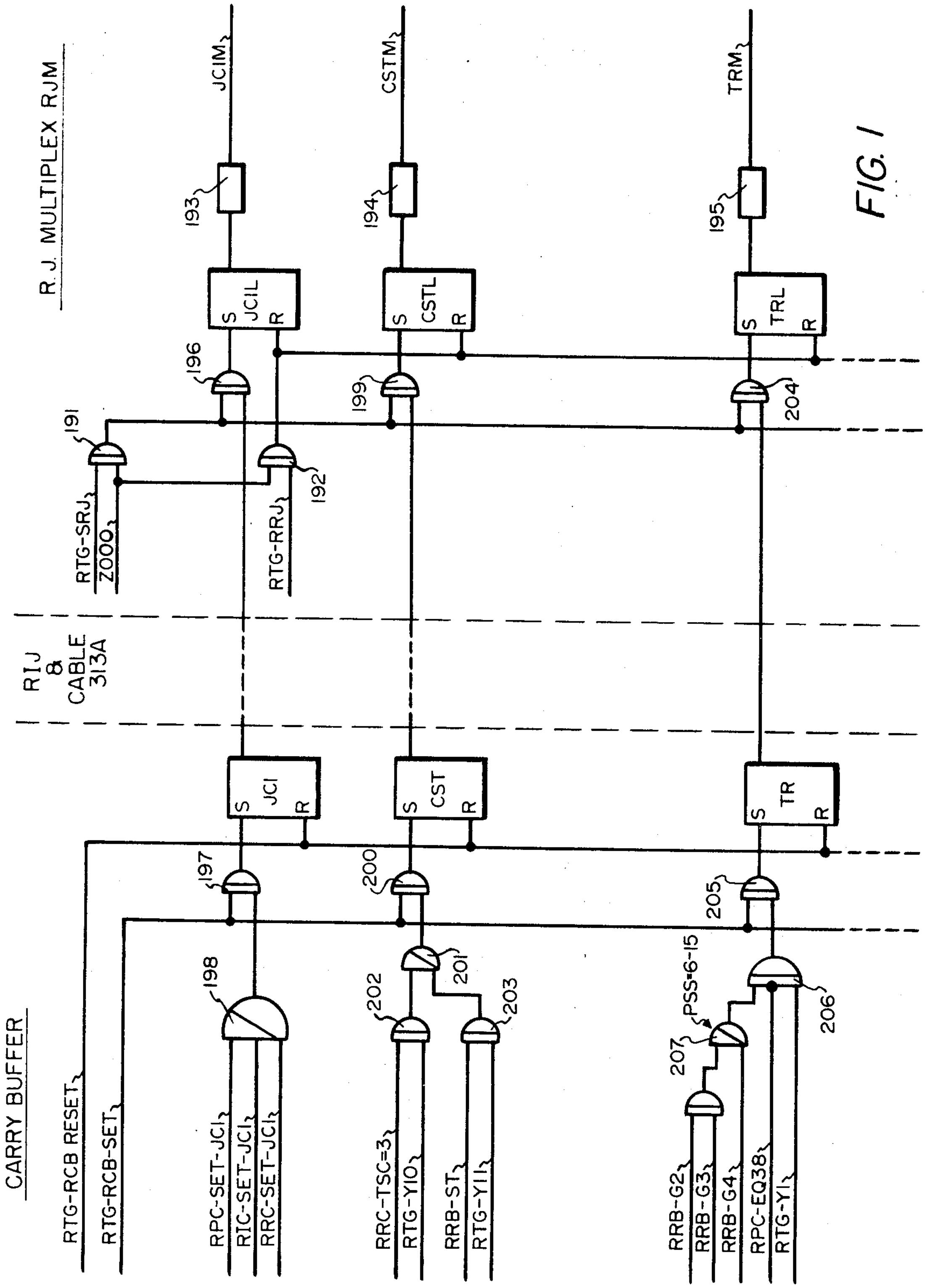
FIG. 1 is a diagram showing the multiplex circuits and carry buffer circuits for the register junctor control arrangement of the present invention.
Figure 2:
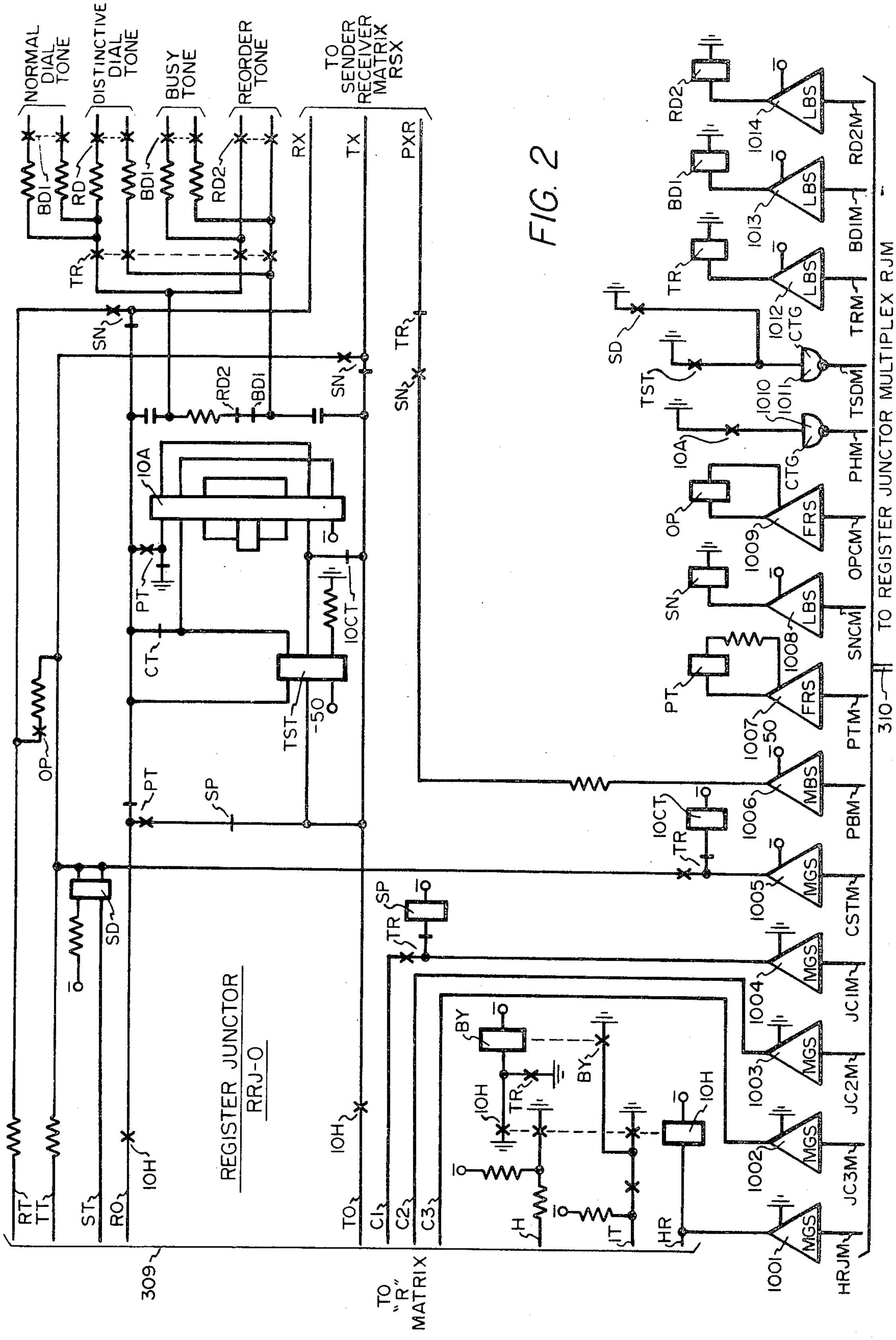
FIG. 2 is a schematic and functional block diagram of a register junctor.

Referring now to FIGS. 1 and 2 of the drawings, there is shown a register junctor RRJ–0 and the pertinent portion of the register junctor multiplex RJM with the associated carry buffer latches and logic circuits. During the originating portion of a call, certain control devices, such as relay 10CT and the relay SP, in the register junctor are employed, and are operated in response to signals received from the multiplex RJM. The relay 10CT is the coin test relay which is used in party and coin detection, and the relay SP is a special function relay required for a coin deposit test for a single slot dual tone multifrequency (touch) calling paystation. Certain other control devices, such as the relay SD and the control lead Cl, are used during the terminating portion of the establishment of the connection to a called line. Relay SD recognizes that the terminating marker has seized the outgoing or terminating junctor and receives start dialing commands from a distant office. The lead Cl is a control lead for conveying a signal to the orginating junctor. By means of the transfer contacts of a relay TR, the relays 10CT and SP respond to signals received from the register carry buffer latches via the multiplex RJM over a pair of single conductors CSTM and JClM, respectively, via the corresponding drivers 1005 and 1004 during the originating portion of a call. During the terminating portion of the call, the relay TR operates in response to a signal over lead TRM from the multiplex RJM and transfers the leads CSTM and JClM via their drivers from the relays 10CT and SP to the respective devices—relay SD and control lead Cl.

As a result, the single leads CSTM and JClM serve two functions at two different intervals of time during the processing of a call. Moreover, other transfer contacts of the relay TR connect during the originating portion of the call normal dial tone or distinctive dial tone to the calling line via leads RO and TO, and connects during the terminating phase of the call busy tone or reorder tone to the leads TO and RO. As a result, two relays are saved in the register junctor in addition to two multiplex conductors and associated circuitry.

GENERAL SYSTEM DESCRIPTION

Figure 3:
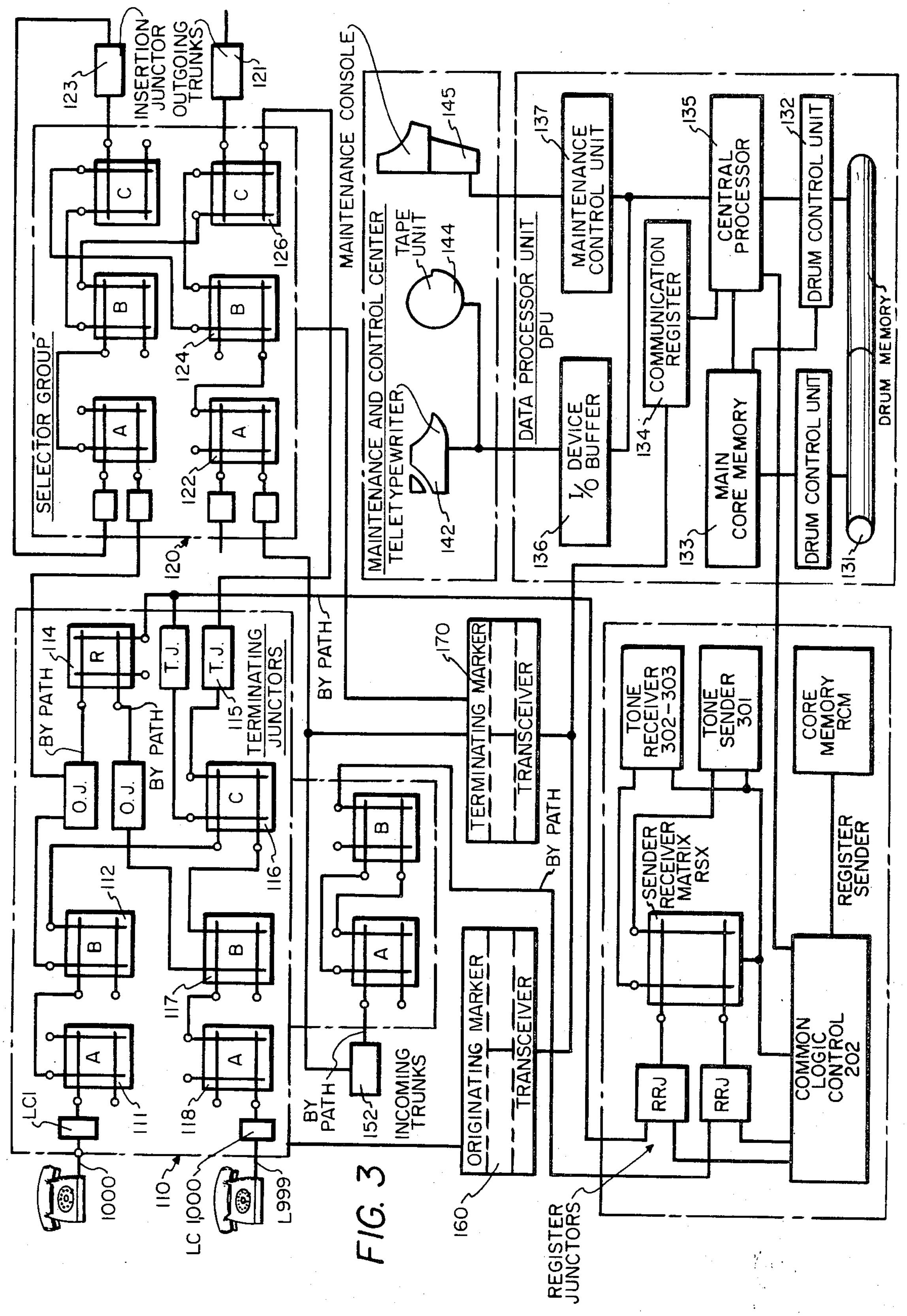
FIG. 3 is a block diagram of a communication switching system incorporating the preferred embodiment of the invention.

The telephone switching system is shown in FIG. 3. The system is disclosed in said Register-Sender patent application. The system comprises a switching portion comprising a plurality of line groups such as line group 110, a plurality of selector groups such as selector group 120, a plurality of trunk-register groups such as group 150, a plurality of originating markers, such as marker 160, and a plurality of terminating markers such as marker 170; and a control portion which includes register-sender groups such as RS, data processing unit DPU, and a maintenance control center 140. The line group 110 includes reed-relay switching network stages A, B, C and R for providing local lines L000–L999 with a means of accessing the system for originating calls and for providing a means of terminating calls destined for local customers. The trunk-register group 150 also includes reed-relay switching networks A and B to provide access for incoming trunks 152 to connect them to the register-sender, the trunks also being connected to selector inlets. The selector group 120 forms an intermediate switch and may be considered the call distribution center of the system, which routes calls appearing on its inlets from line groups or from incoming trunks to appropriate destinations, such as local lines or outgoing trunks to other offices, by way of reed-relay switching stages A, B and C. Thus the line group 110, the trunk-register groups 150, and the selector group 120 form the switching network for this system and provide full-metallic paths through the office for signaling and transmission.

The originating marker 160 provides high-speed control of the switching network to connect calls entering the system to the register-sender 200. The terminating markers 160 control the switching networks of the selector group 120 for establishing connections therethrough; and if a call is to be terminated at a local customer's line in the office then the terminating marker sets up a connection through both the selector group 120 and the line group 120 to the local line.

The register-sender RS provides for receiving and storing of incoming digits and for outpulsing digits to distant offices, when required. Incoming digits in the dial pulse mode, in the form of dual tone (touch) calling multifrequency signals from local lines, or in the form of multifrequency signals from incoming trunks are accommodated by the register-sender. A group of register junctors RRJ function as peripheral units as an interface between the switching network and the common logic circuits of the register-sender. The ferrite core memory RCM stores the digital information under the control of a common logic 202. Incoming digits may be supplied from the register junctors via a register receiver matrix RSX and tone receivers 302–303 to a common logic, or may be received in dial pulse mode directly from the register junctors. Digits may be outpulsed by dial pulse generators directly from a register junctor or multifrequency senders 301 which are selectively connected to the register junctors via the sender-receiver matrix RSX. The common logic control 202, and the core memory RCM form the register apparatus of the system, and provide a pool of registers for storing call processing information received via the register junctors RRJ. The information is stored in the core memory RCM on a time division multiplex sequential access basis, and the memory RCM can be accessed by other subsystems such as the data processor unit 130 on a random access basis.

The data processor unit DPU provides stored program computer control for processing calls through the system. Instructions provided by the unit DPU are utilized by the register RS and other subsystems for processing and routing of the call. The unit DPU includes a drum memory 131 for storing, among other information, the equipment number information for translation purposes. A pair of drum control units, such as the unit 132 cooperate with a main core memory 133 and control the drum 131. A central processor 135 accesses the register-sender RS and communicates with the main core memory 133 to provide the computer control for processing calls through the system. A communication register 134 transfers information between the central processor and the originating markers 160 and terminating markers 170. An input/output device buffer 136 and a maintenance control unit 137 transfer information from the maintenance control center 140.

The line group 110 in addition to the switching stages includes originating junctors 113 and terminating junctors 115. On an originating call the line group provides concentration from the line terminals to the originating junctor. Each originating junctor provides the split between calling and called parties while the call is being established, thereby providing a separate path for signaling. On a terminating call, the line group 110 provides expansion from the terminating junctors to the called line. The terminating junctors provide ringing control, battery feed, and line supervision for calling and called lines. An originating junctor is used for every call originating from a local line and remains in the connection for the duration of the call. The originating junctor extends the calling line signaling path to the register junctor RRJ of the register-sender RS, and at the same time provides a separate signaling path from the register-sender to the selector group 120 for outpulsing, when required. The originating junctor isolates the calling line until cut-through is effected, at which time the calling party is switched through to the selector group inlet. The originating junctor also provides line lock out. The terminating junctor is used for every call terminating on a local line and remains in the connection for the duration of the call.

The selector group 120 is the equipment group which provides intermediate mixing and distribution of the traffic from various incoming trunks and junctors on its inlets to various outgoing trunks and junctors on its outlets.

The markers used in the system are electronic units which control the selection of idle paths in the establishing of connections through the matrices, as explained more fully in said marker patent application. The originating marker 160 detects calls for service in the line and/or trunk register group 150, and controls the selection of idle paths and the establishment of connections through these groups. On line originated calls, the originating marker detects calls for service in the line matrix, controls path selection between the line and originating junctors and between originating junctors and register junctors. On incoming trunk calls the originating marker 160 detects calls for service in the incoming trunks connected to the trunk register group 150 and controls path selection between the incoming trunks 152 and register junctors RRJ.

The terminating marker 170 controls the selection of idle path in the establishing of connections for terminating calls. The terminating marker 170 closes a matrix access circuit which connects the terminating marker to the selector group 120 containing a call-for-service, and if the call is terminated in a local line, the terminating marker 170 closes another access circuit which in turn connects the marker to the line group 120. The marker connects an inlet of the selector group to an idle junctor or trunk circuit. If the call is to an idle line the terminating marker selects an idle terminating junctor and connects it to a line group inlet, as well as connecting it to a selector group inlet. For this purpose the appropriate idle junctor is selected and a path through the line group 110 and the selector group 120 is established.

The data processor unit 130 is the central coordinating unit and communication hub for the system. It is in essence a general purpose computer with special input-output and maintenance features which enable it to process data. The data processing unit includes control of: the originating process communication (receipt of line identity, etc.), the translation operation, route selection, and the terminating process communication. The translation operation includes: class-of-service look-up, inlet-to-directory number translation, matrix outlet-to-matrix inlet translation, code translation and certain special feature translations.

TYPICAL CALLS

This part presents a simplified explanation of how two basic call types are processed by the system. The following call types are covered in the order listed: (1) call from a local party served by one switching unit to another local party served by the same switching unit, and (2) call from a local party served by a switching unit destined for a party served by a distant office, via an outgoing trunk.

In the following presentations, reed relays are referred to as correeds. Not all of the data processing operations which take place are included.

LOCAL LINE-TO-LOCAL LINE CALL

When a customer goes off-hook, the D.C. line loop is closed, causing the line correed of his line circuit to be operated. This action constitutes seizure of the central office switching equipment, and places a call-for-service.

After an originating marker has identified the calling line equipment number, has preselected an idle path, and has identified the R unit outlet, this information is loaded into the marker communication register and sent to the data processor unit via its communication transceiver.

While sending line number identity (LNI) and route data to the data processor, the marker operates and tests the path from the calling line to the register junctor. The closed loop from the calling station operates the register junctor pulsing relay, contacts of this relay are coupled to a multiplex pulsing highway.

The data processor unit, upon being informed of a call origination, enters the originating phase.

As previously stated, the "data frame" (block of information) sent by the marker includes the equipment identity of the originator, originating junctor and register junctor, plus control and status information. The control and status information is used by the data processor control program in selecting the proper function to be performed on the data frame.

The data processor analyzes the data frame sent to it, and from it determines the register junctor identity. A register junctor translation is required because there is no direct relationship between the register junctor identity as found by the marker and the actual register junctor identity. The register junctor number specifies a unique cell of storage in the core memories of both the register-sender and the data processor, and is used to identify the call as it is processed by the remaining call processing programs.

Once the register junctor identity is known, the data frame is stored in the data processor's call history table (addressed by register junctor number), and the register-sender is notified that an origination has been processed to the specified register junctor.

Upon detecting the pulsing highway and a notification from the data processor that an origination has been processed to the specified register junctor, the central control circuit of the register-sender set up a hold ground in the register junctor. The marker, after observing the register junctor hold ground and that the network is holding, disconnects from the matrix. The entire marker operation takes approximately 75 milliseconds.

Following the register junctor translation, the data processor performs a class-ef-service translation. Included in the class-of-service is information concerning party test, coin test, type of ready-to-receive signaling such as dial tone required, type of receiver (if any) required, billing and routing, customer special features, and control information used by the digit analysis and terminating phase of the call processing function. The control information indicates total number of digits to be received before requesting the first dialed pattern translation, pattern recognition field of special prefix or access codes, etc.

The class-of-service translation is initiated by the same marker-to-data processor data frame that initiated the register junctor translation, and consists of retrieving from drum memory the originating class-of-service data by an associative search, keyed on the originator's LNI (line number identity). Part of the class-of-service information is stored in the call history table (in the data processor unit core memory), and part of it is transferred to the register-sender core memory where it is used to control the register junctor.

Before the transfer of data to the register-sender memory takes place, the class-of-service information is first analyzed to see if special action is required (e.g., non-dial lines or blocked originations). The register junctor is informed of any special services the call it is handling must have. This is accomplished by the data processor loading the results of the class-of-service translation into the register-sender memory words associated with the register junctor.

After a tone receiver connection (if required), the register junctor returns dial tone and the customer proceeds to key (touch calling telephone sets) or dial the directory number of the desired party. (Party test on ANI lines is performed at this time.)

The register junctor pulse repeating correed follows the incoming pulses (dial pulse call assumed), and repeats them to the register-sender central control circuit (via a lead multiplex). The accumulated digits are stored in the register-sender core memory.

In this example, a local line without special features is assumed. The register-sender requests a translation after collecting the first three digits. At this point, the data processor enters the second major phase of the call processing function—the digit analysis phase.

The digit analysis phase includes all functions that are performed on incoming digits in order to provide a route for the terminating process phase of the call processing function. The major inputs for this phase are the dialed digits received by the register-sender and the originator's class-of-service which was retrieved and stored in the call history table by the originating process phase. The originating class-of-service and the routing plan that is in effect is used to access the correct data tables and provide the proper interpretation of the dialed digits and the proper route for local terminating (this example) or outgoing calls.

Since a local-to-local call is being described (assumed), the data processor will instruct the register-sender to accumulate a total of seven digits and request a second translation. The register-sender continues collecting and storing the incoming digits until a total of seven digits have been stored. At this point, the register-sender requests a second translation from the data processor.

For this call, the second translation is the final translation, the result of which will be the necessary instructions to switch the call through to its destination. This information is assembled in the dedicated call history table in the data processor core memory. Control is transferred to the terminating process phase.

The terminating process phase is the third (and final) major phase of the call processing function. Sufficient information is gathered to instruct the terminating marker to establish a path from the selector matrix inlet to either a terminating local line (this example) or a trunk group. This information plus control information (e.g., ringing code) is sent to the terminating marker.

On receipt of a response from the terminating marker, indicating its attempt to establish the connection was successful, the data processor instructs the register-sender to cut through the originating junctor and disconnect on local calls (or begin sending on trunk calls). The disconnect of the register-sender completes the data processor call processing function. The following paragraphs describe the three-way interworking of the data processor, terminating marker, and the register-sender as the data frame is sent to the terminating marker, the call is forwarded to the called party and terminated.

A check is made of the idle state of the data processor communication register, and a terminating marker. If both are idle, the data processor writes into register-sender core memory that this register junctor is working with a terminating marker. All routing information is then loaded into the communication register and sent to the terminating marker in a serial communication.

The register-sender now monitors the ST lead (not shown) to the network, awaiting a ground to be provided by the terminating marker.

The marker checks the called line to see if it is idle. If it is idle, the marker continues its operation. These operations include the pulling and holding of a connection from the originating junctor to the called line via the selector matrix, a terminating junctor, and the line matrix.

Upon receipt of the ground signal on the ST lead from the terminating marker, the register-sender returns a ground on the ST lead to hold the terminating path to the terminating junctor.

When the operation of the matrices has been verified by the marker, it releases, then informs the data processor of the identity of the path and that the connection has been established. The data processor recognizes from the terminating class that no further extension of this call is required. It then addresses the register-sender core memory with instructions to switch the originating path through the originating junctor.

The register junctor signals the originating junctor to switch through and disconnects from the path, releasing the R matrix. The originating junctor remains held by the terminating junctor via the selector matrix. The register-sender clears its asociated memory slot and releases itself from the call. The dedicated call history table (for that register) in the data processor core memory is returned to idle.

LOCAL LINE-TO-OUTGOING TRUNK CALL

The processing of a call originated by a local customer, but destined for a distant office, is handled the same as previously described for a "local-to-local" call up to the point where a three-digit translation has occurred. The digits are analyzed and it is determined that the call destination is not a local line. Operation from this point forward is described in subsequent paragraphs.

For this example, the call is originating from a rotary dial line. The customer is making a seven-digit EAS (extended area service) call requiring tandem switching through the connecting office. The connecting office is equipped for wink-start pulsing. The trunk to the connecting office is an E and M trunk requiring D.C. pulsing.

The routing information and the class of the calling party allows the data processor to determine all register-sender instructions necessary to forward this call toward its destination.

The data processor writes the sending requirements into the register-sender core memory fields. These include the following information and instructions for this example: (a) early outpulsing of all digits received (EOP field is set), (b) when seven digits are received, dialing is finished (TL field is set equal to 7), (c) close terminating loop in the register junctor, and (d) working with the terminating marker. There are also other instructions relating to start signals, send mode, etc.

The network switching instruction is sent to the terminating marker via the communication register. The marker then makes various tests, selects a selector outlet, and completes a path thereto. When the marker recognizes that the path has been connected properly, it clears from the matrix and sends a message to the data processor indicating successful call completion, and the identity of the trunk that was used.

The data processor will place this information in the call history table and write into register-sender core memory that outpulsing may proceed when start signals have been received. When the distant office is prepared to receive digits, it will return an off-hook signal of approximately 150 milliseconds which the outgoing trunk converts to a ground on the S lead. This causes the stop dial (SD) relay in the register junctor to operate. At the end of the 150-millisecond period, the SD relay restores and outpulsing begins.

The register-sender will outpulse the digits accumulated at this point (early outpulsing) and will outpulse each additional digit as it is received from the customer (no digits are deleted or prefixed in this example). When seven digits have been accumulated and sent, the register-sender will signal the originating junctor to switch through.

The register junctor will release itself from the call, releasing the R matrix. The register-sender memory is cleared, and the call history table in the data processor is reset. The calling party now controls the outgoing trunk. When the called party served by the connecting office answers, they may begin to converse. The calling line is now connected to the connecting office via the line matrix, originating junctor, selector matrix, and outgoing trunk.

When the calling party disconnects, the outgoing trunk releases the selector matrix, releasing the originating junctor and line matrix. Release of the line cut-off correed idles the customer's line for future calls.

The outgoing trunk remains busy for a short time to insure release of the connecting office. It then returns to idle.

SYMBOLISM FOR GATES AND BISTABLE DEVICES

The common logic circuits of the register-sender subsystem are generally implemented with integrated circuits, mostly in the form of NAND gates, although some other forms are also used. The showing of the logic in the drawings is simplified by using gate symbols for AND and OR functions, the AND function being indicated by a line across the gate parallel to the input base line, and the OR function being indicated by a diagonal line across the gate. Inversion is indicated by a small circle on either an input or an output lead. The gates are shown as having any number of inputs and outputs, but in actual implementation these would be limited by loading requirements well known in the art. Latches are indicated in the drawing by square functional blocks with inputs designated S and R for set and reset respectively; the circuits being in practice implemented generally by two NAND gates with the output of each connected to an input of the other, which makes the circuit a bistable device. The logic also uses bistable devices in the form of JK flip-flops implemented with integrated circuits.

Relay units such as the register junctors include interface circuits for signals to and from the electronic frames. These interface circuits are relay drivers and test gates as shown for example at the bottom of FIG. 2. These circuits use discrete transistors rather than integrated circuits. Relay drivers shown as triangles function as switches to operate the relays. Those designated MGS are main ground switches comprising two transistors connected so that when a true signal is applied at the input, ground potential from the main battery is connected via the emitter-collector path of the output stage in saturation to a relay; those designated MBS are main battery switches connected so that with a true signal at the input the negative terminal of the main battery is connected via the emitter-collector path of the output stage in saturation to a relay; those designated FRS are fast-release relay switches comprising two transistors such that when a true signal is applied to the input the two output leads from the collectors of two transistors connected to the two sides of the relay winding supply a low impedance path to operate the relay; and those designated LBS for low current battery switch comprise a single transistor which when a true signal is applied at the input supplies a low impedance path including the collector-emitter path to operate the relay. The contact test gate designated by CTG is a circuit which when ground is supplied via relay contacts at its input supplies a true signal at its output.

REGISTER JUNCTOR AND ORIGINATING PATH

A diagram of a register junctor RRJ–0 is shown in FIG. 2.

The register junctor's function is the interface between the subscriber lines and incoming trunks, and the time-shared circuits of the register-sender. The register junctors are used for digit receiving or sending, tone application, a battery feed device to the calling station, party and coin testing, busy and idle indication to the originating marker, and as a source of hold for the matrix path.

There are two types of register junctors; the local register junctors used with the R stage outlet to subscriber lines and paystations, and incoming register junctors used with incoming trunks and having less complexities than the local register junctors.

The register junctor RRJ–0 shown in FIG. 2 is a local register junctor.

Relay 10H is a reed relay (correed). It is energized by the originating marker applying ground potential to the HR lead. Contacts of this relay connect the tip and ring leads TO and RO to relay 10A, close a path to operate relay BY, which in turn has contacts to apply ground to the IT lead and via a path not shown lights a busy lamp. Contacts of relay 10H also supply ground potential to lead H to hold the originating connection. Relay 10H releases after the register-sender receives specific instructions from the data processing unit that the terminating marker has completed its functions which will cause the register junctor to eventually be released.

Relay BY is an HQA relay. This relay is normally operated by ground potential via contacts of the H relay, but can also be operated by a busy switch not shown. When this happens it makes the register junctor busy to the originating marker. Contacts of relay TR will also hold relay BY operated. Relay TR is operated during sequence states PSS=6 to PSS=15 which will be described in the operation of the common logic circuits. Since the relay 10H drops after sequence state PSS=12, relay TR will hold up the relay BY until memory is cleared. Relay BY is slow to release (25 milliseconds) because of a diode not shown across its coil. This makes it the last relay in the register junctor to release.

Relay 10A is a single reed relay with three windings, as disclosed in U.S. Pat. 3,492,613 to H. W. Van Husen. Two of the windings are connected in series while the third is not actively used. Relay 10A is operated under the control of the subscriber loop (or trunk) via the tip and ring leads. After relay 10H has operated connecting the register junctor to the subscriber line, with the telephone at the subscriber station off-hook closing the path between the T and R relays, relay 10A operates. Contacts of this relay supply ground to a contact test gate 1010, which generates a true signal on lead PHM (pulsing highway) which via the multiplex circuits is supplied to the register controller RRC (not shown herein but described in detail in the Register-Sender application). During the reception of dialed digits relay 10A follows the dial pulses which are therefore repeated via lead PHM to the common logic circuits. Relay A is also used in conjunction with relay TST during a party or coin test, and operates if there is a ground on the tip lead at the subscriber station. When relay 10H releases during sequence state PSS=13, relay 10A is also released.

Relay BD1 is an HQA relay. It may be operated under two sets of circumstances. The first is to return dial tone to the subscriber during sequence state PSS=2 or PSS=3, and the second is to return busy tone to a subscriber line or trunk during sequence state PSS=11, at which time relay TR is operated. This relay is operated via a signal from the multiplex circuits on lead BD1M which operates the relay driver 1013.

Relay RD2 is an HQA relay. It is operated via a signal on lead RD2M operating relay driver 1014 under two sets of circumstances, one being to return distinctive dial tone to a subscriber, and the second being to return reorder tone if relay TR is also operated.

Relay 10CT is a reed relay. This relay is controlled by the TSC (test sequence counter) in memory. It is operated for 10 milliseconds while performing a coin test or party test. While it is operated it includes the TST relay in the test path from the relay 10A and source battery, to the ground provided for the subscriber equipment.

Relay PT shown in FIG. 10 as a single relay actually comprises two mercury wetted reed relays in parallel, operated by the same fast release relay switch 1007 under control of a signal on lead PTM. They are operated for 30 milliseconds for control of the path for coin and party tests.

Relay SP is a reed relay which is used to open a parallel path during coin testing that is possible when testing for coin deposit from a single slot touch calling telephone. Without the path being open a "series" relay (or equivalent) in some (new single slot) coin telephones may not release, thus preventing coin ground from being applied to the tip side of the line. It is operated as a function of the CB bit of memory and TSC having started. It is operated for the same 30 milliseconds as PT during coin test.

Relay TST is a mercury wetted reed relay with three windings. This relay is used for coin deposited test and party two identification. When the test is not being made two of the windings are shorted out by contacts of relay 10CT. The third winding is constantly active giving a reverse-bias in the relay so that any contact switch bounce or stray potential will not operate relay TST giving a false indication.

Relay TR is an HQA relay which is activated during sequence states PSS=6 or greater via relay driver 1012. When operated this relay disables the path for dial tone and enables the busy and reorder tone paths, removes relay CT from the circuit and prepares a path for relay SD, removes relay SP from the circuit and prepares a path for lead C1 to the originating trunk circuit, maintains relay BY operated and opens a path from the sender-receiver pull battery switch 1006 via lead PXR to the matrix. This last set of contacts is a protection feature to insure that a multiple path is not pulled in the matrix should the main battery switch 1006 fail.

Relay SD is a mercury wetted reed relay. This relay (start dial) has two functions in the call process. First it recognizes that the terminating marker has seized the outgoing trunk or terminating junctor and it also receives start dialing commands from the distant office. Then the terminating marker seizes an "S" relay of the trunk or terminating junctor, relay SD is also operated. Contacts of this relay operate a test gate 1011 to send a logic signal to the register-sender central control via lead TSDM. In response thereto a signal on lead CSTM operates relay driver 1005 to relay SD. When the terminating marker releases, relay SD drops, but the S relay of the terminating junctor or trunk is held by the ground from relay driver 1005. When a distant office signals with a start dial (or stop dial if sending is in progress) a ground is received on lead ST causing relay SD to operate. When the distant office causes the start/stop dial to cease, relay SD releases to supply a signal to the register-sender common logic.

Relay OP is a mercury wetted reed relay which has three functions. First it is operated while making a sender or receiver connection. When contacts of relay OP close an A relay in the sender or receiver operates to check continuity of the tip and ring paths. Second, the relay operates during operation of a terminating marker connecting to an outgoing trunk so that the terminating marker can make a continuity check. And lastly this relay is operated and released to send dial pulsing signals. Energizing and releasing the relay causes a path via the tip and ring to alternately short and open.

Relay SN is an HQA relay which has two functions. First it is operated during the connection of a sender or receiver. One set of contacts close to connect the pull relay driver main battery switch 1006 to lead PXR to the matrix during connection. The other purpose is to connect an MF sender to the terminating tip and ring conductors and isolate the originating and terminating tip and ring paths within the register junctor.

An incoming register junctor is similar to the local register junctor described above except that relays TST, 10CT, PT, RD2, and SP are omitted.

MULTIPLEX TO REGISTER JUNCTORS

Figure 4:
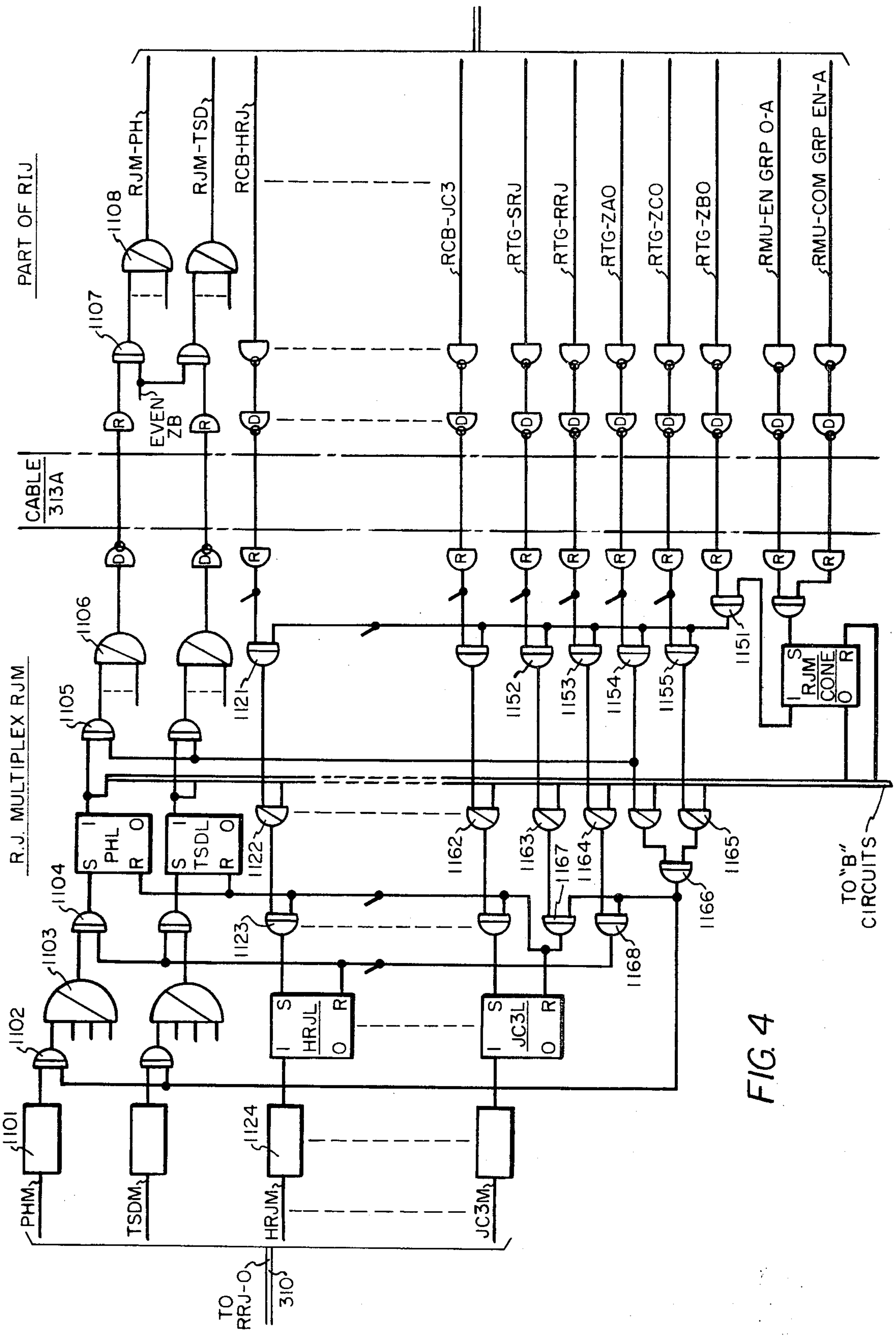
FIG. 4 is a diagram showing the register junctor multiplex circuits.

A portion of the multiplex circuits between the register junctors and frame RCC is shown by a functional block diagram in FIG. 4. In unit RJM the circuits are divided into eight groups, each group serving 24 register junctors. The circuits shown in FIG. 4 are a part of unit RJM for multiplexing signals to and from the register junctor RRJ–0. The connections between the groups in RJM and the unit RIJ are via conductors in the set of cables 313A, which comprise DC links having cable drivers designated by D at the input end and cable receivers designated by R at the output end, each link being via a twisted pair which includes a ground return conductor not shown. The drivers provide signal inversion, while the receivers do not. Note that some of the signal leads for RIJ are designated with RTG or RMU. These signals actually originate in the units RTG–A and RMU–A shown in FIG. 4 of the Register-Sender patent application and are repeated through various circuits including conductors of the set of cables 321A. While RJM group 0 normally operates with the common logic circuits of RCC–A and RMM–A, the group also includes circuits for operating with the units RCC–B and RMM–B, under the control of a latch RJM CONF which is controlled by signals from unit RMU. Thus when the signals RMU–EN GRP 0–A and RMU–COM GRP EN–A are both true then the latch RJM CONF is set so that this group operates with the A circuits, and may be reset by similar signals from unit RIJ–B to operate with the B circuits.

The connection between unit RJM and each register junctor includes special interface circuits including electronic devices and chokes, these circuits being shown in FIG. 4 by blocks such as 1101 for scan leads from the register junctor and 1124 for control leads to the register junctor. For each register junctor there are two scan leads PHM and TSDM shown in FIGS. 2 and 4, and a plurality of control leads as shown in FIG. 2 in the set of conductors 310, two of which HRJM and JC3M are shown in FIG. 4. The unit RJM for each group includes the two scan latches PHL and TSDL coupled to the corresponding scan leads PHM and TSDM, these scan latches being common to three register junctors served by the group. There are a plurality of control latches individual to each register junctor, one for each of the control leads, control latches HRJL and JC3L being shown in FIG. 4.

Address conductors from the decode circuits 601, 602 and 603 of the register timing generator (FIG. 6 of the Register-Sender application) supply the ZA, ZB and ZC signals, select the time slots of the register junctors in sequence and control the multiplex circuits accordingly, each register junctor being scanned during its time slot and its control latches selectively set. The signals RTG–SRJ and RTG–RRJ determine the time interval during each time slot at which the latches may be set and reset. The signal on lead RTG–RRJ is true during coincidence of the signals Y1 and X2 which occurs near the beginning of a time slot, and the signal on lead RTG–SRJ is true during coincidence of the signals Y11 and X5 which occurs near the end of the time slot. These signals may be inhibited by the maintenance control unit via lead RMU–TIM–INBT. In FIG. 4 the three conductors RTG–ZAO, RTG–ZBO and RTG–ZCO for addressing the register junctor RRJ–O are shown.

The ZB signal is used for group selection; thus when the signal on lead RTG–ZBO is true and the latch RJM CONF is set for the A circuits, gate 1151 is enabled to supply inputs for selecting gates 1152, 1153, 1154 and 1155 for the other timing generator signals, and the plurality of gates including gate 1121 for all of the control signals from the carry buffer RCB. These timing generator and carry buffer signal leads are also multiplied to the other groups. The outputs of these gates are connected to OR gates such as 1122 for the control signals and 1162–1165 for the timing signals; these OR gates also having corresponding inputs from the B circuits for controlling the group of register junctors when latch RJM CONF is in the reset condition.

When the signals on leads RTG–ZAO and RTG–ZCO are both true during the time that the signal on lead RTG–ZBO is also true, then gate 1166 is enabled, designating the time slot for register junctor RRJ–O. The output of gate 1166 supplies inputs to the scan gates such as 1102, and also to gates 1167 and 1168 for the latch input control signals.

The signal on lead RTG–RRJ near the beginning of the time slot via the cable link and gates 1153, 1163 and 1168 suplies an input to gate 1104. If the signal from the register junctor on lead PHM is true, then via gates 1102 and 1103 another true input is supplied to gate 1104, which causes the latch PHL to be set. The output from latch PHL is supplied to an AND gate 1105, and the signal on RTG–ZAO via the cable link and gate 1154 supplies another input, and the output of this gate is supplied via OR gate 1106, the cable link, and gates 1107 and 1108 in the unit RIJ to lead RJM–PH for use by the common logic circuits. Gate 1106 has eight inputs from different PHL latches in the group, so that 24 register junctors have their PHM signals multiplexed to the output of gate 1106. The signal on lead EVEN–ZB in unit RIJ is true during the time slots for groups 0, 2, 4 and 6. Gate 1108 has eight inputs for the respective eight groups, so that its output represents the multiplexed condition for all 192 register junctors, each controlling the output signal during its own time slot. The signal to lead RJM–TSD is multiplexed in like manner for the signals on lead TSDM from the 192 register junctors. Near the end of each time slot the signal on lead RTG–SRJ via the cable line and gates 1152, 1162 and 1167 resets the scan latches in preparation for scanning in the next time slot.

All of the control latches for a particular register junctor are reset near the beginning of its time slot in response to the signal on lead RTG–RRJ which is supplied via the cable link and gates 1153, 1163 and 1168. The input control signals are from latches in the carry buffer circuit, which are selectively set at various times during the time slot in accordance with the logical processing. If, for example, the latch supplying lead RCB–HRJ has been set during this time slot, then the true signal is supplied via the cable link to the group select gate 1121, and thence via gate 1122 to gate 1123. Near the end of the time slot the signal on lead RTG–SRJ via the cable link and gates 1152, 1162 and 1167 supplies another input to gate 1123 and corresponding gates for the other control latches. The output from gate 1123 sets the latch HRJL, and its output via interface circuit 1124 supplies the signal to lead HRJM, which in the register junctor of FIG. 10 via relay driver 1001 supplies a holding ground for relay 10H. The other control latches and control signals to the register junctor are similarly controlled. Thus it may be seen that if the logical conditions are such that the carry buffer latch is set in successive time slots for a particular register junctor, then the control signal to the register junctor is continuously true except during the time slot itself when the control latch is in the reset condition. This short interruption of the control signal does not affect the relays in the register junctor.

REGISTER-SENDER MEMORY LAYOUT

The register-sender subsystem includes as shown in FIG. 3 a core memory RCM, which has 16 word stores individually assigned to each register junctor. Timing control signals are supplied from a timing generator in repetitive cycles, with each register junctor having one time slot per cycle, the time slot timing signals being designated by a prefix Z followed by the junctor number. The time slots are divided into sub-time slots designated by a Y prefix; there being eleven sub-time slot signals designated Y1 through Y11. The memory access arrangement is such that two words are read during a sub-time slot, the information is processed by the common logic circuits, and then these two words are rewritten. The combination of two word stores of memory which are accessed during the same sub-time slot are designated herein as a row of memory. The area of memory comprising eight rows (16 words) individually assigned to one register junctor is referred to as a *block* of memory.

Figure 5:
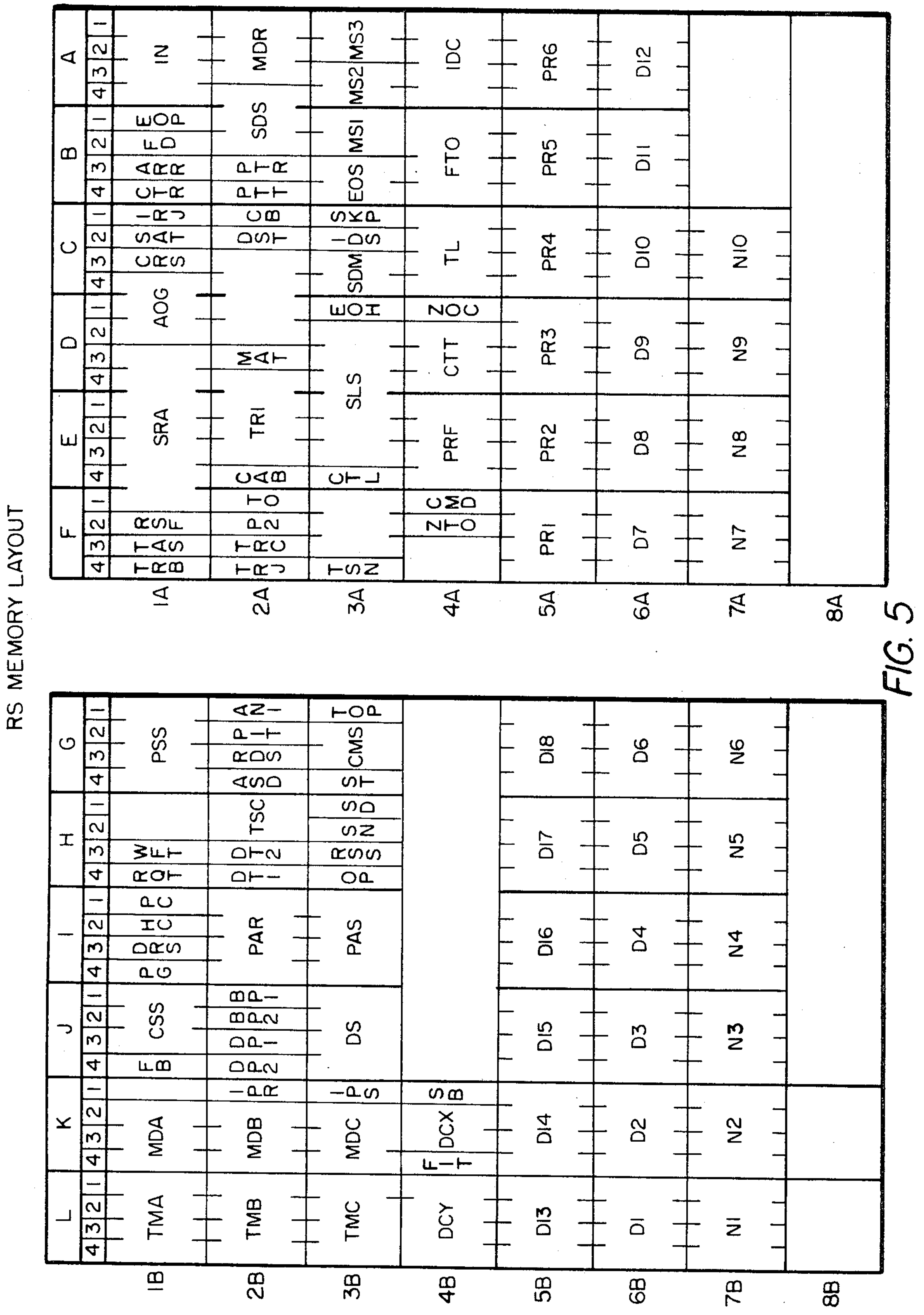
FIG. 5 is a layout diagram of the storage area in memory for one register.

The memory layout for one block is shown in FIG. 5. Each word store of the memory comprises 26 cores of which 25 are used for bits of call information. As shown in FIG. 5 the two word stores for each row the designated A on the right and B on the left respectively, and each is divided into six positions of four bits each, the positions being designated A–F in word A and G–1 in word B, with the bits numbered 1–4 in each position. Row 1 is used for process control information, row 2 for register control information, row 3 for sending information, row 4 for translation control and miscellaneous information, rows 5 and 6 for prefix and called number digits, row 7 for calling number digits, and row 8 is a spare.

The scan organization provides for three different modes of scanning. In each mode the first three rows are control rows which are accessed twice during each time slot, row 1 being accessed during sub-time slots Y1 and Y9, row 2 during sub-time slots Y2 and Y10, and row 3 during sub-time slots Y3 and Y11. Row 4 is accessed in every mode during sub-time slot Y4. In mode A rows 5 and 6 are accessed during sub-time slots Y5 and Y6, and then the scan jumps to Y9. In mode B the scan of rows 5 and 6 is skipped so that rows 7 and 8 are accessed with sub-time slots Y7 and Y8 following sub-time slot Y4. Mode C is used for maintenance purposes and uses all 11 of the sub-time slots in sequence, thereby providing a longer than normal time slot interval. Mode A is the normal mode used while receiving or sending called number digits, and mode B is used for receiving or sending calling number identification digits for the processing of a call.

Call processing in the register-sender subsystem is explained in the Register-Sender patent application with reference to the flow charts and equations disclosed therein. The various steps of call processing are controlled by processing sequence states designated PSS, stored in bits G1, G2, G3 and G4 of word 1B, as shown in FIG. 5. During sub-time slot Y1 the states of these four bits are transferred into four carry buffer latches designated PSSC, and the decoded outputs PSSC=0 through PSSC=15 supply the processing sequence state indication during other sub-time slots.

In word 2B, bit positions H1 and H2 of the memory, there is stored the word TSC (test sequence counter) which is an internal control field used to control the sequence and operation of relays in the register junctor for conducting the party and coin test. The results of the party or coin test is contained in the P2 field at bit position F2 of word 2A of the memory. The one-bit control field designated CB (coin box) is used to indicate that the call is from a coin box and that a coin test is required, the bit CB being stored in bit C1 of word 2A. In word 3B, bit position G4, the ST field is stored for the start dial relay SD.

REGISTER JUNCTOR CONTROL ARRANGEMENT

The junctor multiplex circuits RJM are shown in simplified form in FIG. 1 herein. The time slot signals for RRJ–0 are simplified to show ZOOO in place of ZAO, ZBO and ZCO, and the address selection gating is simplified to gates 191 and 192. The special interface circuits including electronic devices and chokes are shown in FIG. 1 by blocks such as 193.

A pair of latches JC1L and CSTL in the multiplex RJM have their outputs connected via the circuits 193 and 194 to the respective single leads JC1M and CSTM, which are connected at their other ends to the respective relay drivers 1004 and 1005 in the register junctor. A latch TRL in the multiplex RJM has its output connected via a circuit 195 to one end of a conductor TRM, the opposite end of which is connected to the driver 1012 in the register junctor.

The ground output of the driver 1004 is connected through the break contacts of the relay TR to one side of the SP relay coil, the other side of which is connected to a negative battery potential. The ground output of the driver 1004 is also connected through the make contacts of the relay TR to the control lead CI. Similarly, the ground output of the driver 1005 is connected through break contacts of the TR relay to the relay 10CT and through the make contacts of the relay TR to the relay SD. The output of the driver 1012 operates the relay TR during the terminating portion of a call. As a result, during the originating portion of a call, signals over leads JC1M and CSTM from the latches JC1L and CSTL cause the respective relays SP and 10CT to operate. During the terminating portion of the call, the relay TR operates in response to a signal over lead TRM, and subsequent thereto signals over the leads JC1M and CSTM cause a ground signal to be applied to lead Cl and cause the relay SD to operate, respectively. Therefore, in accordance with the present invention, it should be noted that the leads JC1M and CSTM serve a dual function in that they convey different types of signals during the originating and terminating portion of the establishment of a connection between a calling line and a called line.

Additionally, in accordance with the invention, normal dial tone and distinctive dial tone leads are connected through break contacts of the TR relay and through a pair of capacitors to the leads RO and TO and thus to the calling line to supply these tone signals to the calling line during the originating portion of the call when the relay TR is not operated. During the terminating portion of the call, the busy tone and reorder tone leads are connected through the make contacts of the TR relay via the same path including the capacitors to the leads RO and TO.

Via a gate 196, the multiplex latch JC1L is set when carry buffer latch JC1 is set and when the output of the gate 191 is true. A gate 197 causes the latch JC1 to be set when the signal RTG–RCB–SET is true and the output of the gate 198 is true. For a detailed explanation of the three input signals to the gate 198, reference may be made to section K of the Register-Sender patent application. The upper signal RPC–SET–JC1 becomes true during the terminating phase of a call when a busy tone is to be returned to a trunk by means of the ground signal over lead C1. The middle signal RIC–SET–JC1 becomes true during the terminating portion of the call for applying the ground signal via the lead C1 to an originating junctor or an incoming trunk for cut-through purposes. The lower signal RRC–SET–JC1 becomes true during the originating portion of the call when a coin test is required for a single coin-slot touch calling paystation.

A gate 199 in the multiplex RJM generates a signal to set the latch CSTL in response to the carry buffer latch CST being set and the gate 191 producing a true output signal. The latch CST is set in response to the true output of the gate 200 when the output of the gate 201 is true and the RTG–RCB–SET signal is true. The outputs of a pair of gates 202 and 203 are connected to the inputs to the gate 201, so that the output of either one of the gates 202 or 203 energizes the gate 201. The gate 202 produces a true output during the Y10 sub-time slot when the signal RRC–TSC=3 becomes true to cause the relay 10CT to operate for a coin test during the originating portion of a call. During Y11 of a terminating portion of a call, the output of the gate 203 becomes true when the signal RRB–ST is true to cause the ground potential to be applied to the relay SD so that it can recognize that the terminating marker has seized an outgoing trunk or terminating junctor, and so that it can receive start dialing commands from the distant office and other functions. For a detailed description of the signals for setting the latch CST, reference may be made to section K of the Register-Sender application.

A gate 204 in the multiplex RJM has its output connected to the set input to the latch TRL so that it can be set when the carry buffer latch TR is set and the output signal of the gate 191 becomes true. A gate 205 sets the latch TR during the terminating portion of the call when the gate 207 produces a true output signal, which occurs when the processing state is equal to PSS=6 or greater and during the sub-time slot Y1. The signal RPC–EQ38 is an inhibit signal which prevents the latch TR from being set and thus the relay TR from being operated during an alternate route situation. Reference may also be made to the Register-Sender patent application for a more complete description of the signals required to set the latch TR.

The carry buffer latch TR is set during sub-time slot Y1 of every cycle in which the sequence state has a value of PSS=6 or greater; which via the multiplex circuits and lead TRM causes the relay TR to be operated.

What is claimed is:

1. In a communication switching system having a plurality of register junctors for connection to calling lines during originating portions of calls to receive call signals so that connections can be established to called lines during terminating portions of calls;

register apparatus comprising a memory and logic circuits shared on a time division multiplex basis, said memory having sets of storage elements, a plurality of registers individually associated with said register junctors, each register comprising a block with a given number of said sets including at least one control set and at least two data sets, a source of cyclically recurring pulses supplied to the memory, a multiplex arrangement associating each register with an individual pulse time slot during which the stored information is recirculated and may be selectively modified by means of the logic circuits, call signal information being received by the logic circuits from the register junctors during the associated time slots for storage in the memory;

each data set of each register being individually associated with a sub-time slot, and said control set of each register being associated with a first sub-time slot preceding and a second sub-time slot following the sub-time slots of the data sets within the time slot of the register; means to read, process and rewrite the information in a set during each associated sub-time slot;

multiplexing apparatus connecting said register junctors to said register apparatus;

each one of said register junctors including at least one pair of originating and terminating indicating means responsive to call-processing control signals from said register apparatus, said originating indicating means being connected via a single conductor to said multiplexing apparatus; and switching means responsive to a transfer control signal from said register apparatus for disconnecting said originating indicating means from said conductor and for connecting said terminating indicating means to said conductor during said terminating portion of said call, whereby said originating indicating means is connected to said conductor during the originating portion of said call and said terminating indicating means is connected to said conductor during the terminating portion of said call.

2. In a communication switching system according to claim 1, further including a second pair of originating and terminating indicating means responsive to control signals from said register apparatus, said second originating indicating means being connected via a second single conductor to said multiplexing apparatus, said switching means in response to said transfer control signal disconnecting said second originating indicating means from said second conductor and connecting said second terminating indicating means to said second conductor during the terminating portion of said call.

3. In a communication switching system according to claim 2, further including in each one of said register junctors originating tone signal means connected to a calling one of said lines during said originating portion of a call and terminating tone signal means adapted to be connected to said calling one of said lines during said terminating portion of a call, said switching means in response to said transfer signal disconnecting said originating tone means from said calling one of said lines and connecting said terminating tone means to said calling one of said lines durig said terminating portion of a call.

4. In a communication switching system according to claim 3, wherein said switching means comprises a transfer relay having its coil connected to a single conductor to said multiplexing apparatus and being operated in response to said transfer signal.

5. In a communication switching system according to claim 4, wherein the first-mentioned pair of originating and terminating indicating means includes a pair of relays having their coils connected to the first-mentioned single conductor and being energized by said control signals supplied via said first-mentioned conductor, said signals comprising a first originating signal being generated during said originating portion of a call and a first terminating signal being generated during said terminating portion of a call.

6. In a communication switching system according to claim 5, wherein said second pair of originating and terminating indicating means includes a relay and a control lead connected to said second conductor and being energized by said control signals supplied via said second conductor, said signals comprising a second originating signal being generated during said originating portion of a call and second terminating signal being generated during said terminating portion of a call.

7. In a communication switching system according to claim 6, wherein said first originating signal comprises a coin and party detection signal.

8. In a communication switching system according to claim 7, wherein said first terminating signal comprises a stop-dialing preparation signal.

9. In a communication switching system according to claim 8, wherein said second originating signal comprises a paystation coin-test signal.

10. In a communication switching system according to claim 9, wherein said second terminating signal comprises a cut-through supervisory initiating signal.

11. In a communication switching system according to claim 10, wherein said originating tone signal means comprises means for conveying normal dial tone, and means for conveying distinctive dial tone.

12. In a communication switching system according to claim 11, wherein said terminating tone signal means comprises means for conveying busy tone, and means for conveying reorder tone.

13. In a communication switching system according to claim 6, wherein said originating tone signal means comprises means for conveying normal dial tone, and means for conveying distinctive dial tone.

14. In a communication switching system according to claim 13, wherein said terminating tone signal means comprises means for conveying busy tone, and means for conveying reorder tone.

References Cited

UNITED STATES PATENTS

| | | | |
|---|---|---|---|
| 3,529,091 | 9/1970 | Butcher | 179—18 EB |
| 3,678,197 | 7/1972 | Panter et al. | 179—18 EB |

THOMAS W. BROWN, Primary Examiner

U.S. Cl. X.R.

179—18 EB